US011206127B2

(12) United States Patent
Liu et al.

(10) Patent No.: US 11,206,127 B2
(45) Date of Patent: Dec. 21, 2021

(54) BLOCKCHAIN-BASED VERIFIABLE INTER-DOMAIN ROUTING VALIDATION METHOD

(71) Applicant: GUANGZHOU UNIVERSITY, Guangzhou (CN)

(72) Inventors: Yaping Liu, Guangzhou (CN); Binxing Fang, Guangzhou (CN); Shuo Zhang, Guangzhou (CN); Zhe Li, Guangzhou (CN); Qingyuan Li, Guangzhou (CN)

(73) Assignee: Guangzhou University

( * ) Notice: Subject to any disclaimer, the term of this patent is extended or adjusted under 35 U.S.C. 154(b) by 0 days.

(21) Appl. No.: 17/100,804

(22) Filed: Nov. 20, 2020

(65) Prior Publication Data

US 2021/0160171 A1    May 27, 2021

(30) Foreign Application Priority Data

Nov. 22, 2019   (CN) .......................... 201911154492.9

(51) Int. Cl.
*H04L 9/00*        (2006.01)
*H04L 9/06*        (2006.01)
(Continued)

(52) U.S. Cl.
CPC ............ *H04L 9/006* (2013.01); *H04L 9/0643* (2013.01); *H04L 9/0825* (2013.01);
(Continued)

(58) Field of Classification Search
CPC ..... H04L 9/006; H04L 9/0643; H04L 9/0825; H04L 9/3239; H04L 9/3247; H04L 45/02;
(Continued)

(56) References Cited

U.S. PATENT DOCUMENTS 8,353,034 B2 *   1/2013   Ji ......................... G06F 21/554
                                                   726/22
9,882,872 B2     1/2018   You et al.
(Continued)

FOREIGN PATENT DOCUMENTS

CN       102035663 A     4/2011
CN       108376368 A     8/2018
(Continued)

OTHER PUBLICATIONS

Galmes et al, "Preventing Route Leaks using a Decentralized Approach: An Experimental Evaluation", 2020, IEEE, p. 1-6.*
(Continued)

*Primary Examiner* — Christopher A Revak

(57) ABSTRACT

The disclosure disclosures a blockchain-based verifiable inter-domain routing validation method, which includes: constructing a blockchain-based verifiable inter-domain routing system consisting of a verifiable inter-domain routing and a routing behavior validation subsystem; constructing, by a sender router R1, a routing behavior validation terminal of an autonomous domain to which the R1 belongs, and the routing validation blockchain system, a routing evidence and a routing evidence validation proposal, validating and endorsing the proposal, determining whether the proposal satisfies an endorsement policy, generating a routing evidence transaction, conducting consensus ordering on the transaction and updating a routing validation blockchain; and constructing, by a receiver router T, a routing behavior validation terminal of an autonomous domain to which the T belongs, and the routing validation blockchain system, a routing request validation message and retrieving whether a routing evidence corresponding to the routing request exists.

11 Claims, 5 Drawing Sheets

(51) Int. Cl.
*H04L 12/751* (2013.01)
*H04L 12/721* (2013.01)
*H04L 12/707* (2013.01)
*H04L 9/08* (2006.01)
*H04L 9/32* (2006.01)

(52) U.S. Cl.
CPC .......... *H04L 9/3239* (2013.01); *H04L 9/3247* (2013.01); *H04L 45/02* (2013.01); *H04L 45/14* (2013.01); *H04L 45/22* (2013.01); *H04L 2209/38* (2013.01)

(58) Field of Classification Search
CPC ..... H04L 45/14; H04L 45/22; H04L 2209/38; H04L 2209/42; H04L 9/3236; H04L 63/1441
See application file for complete search history.

(56) References Cited

U.S. PATENT DOCUMENTS

| | | | |
|---|---|---|---|
| 10,893,022 B1* | 1/2021 | Li | H04L 45/04 |
| 11,115,312 B1* | 9/2021 | Hankins | G06F 16/1837 |
| 2010/0070755 A1 | 3/2010 | Himawan et al. | |
| 2016/0036687 A1 | 2/2016 | Brown et al. | |
| 2017/0366347 A1 | 12/2017 | Smith | |
| 2020/0186458 A1* | 6/2020 | Farag | H04L 9/0643 |
| 2021/0203509 A1* | 7/2021 | Li | H04L 9/3239 |

FOREIGN PATENT DOCUMENTS

| | | |
|---|---|---|
| CN | 108540536 A | 9/2018 |
| CN | 109327528 A | 2/2019 |
| CN | 109447643 A | 3/2019 |
| CN | 110324174 A | 10/2019 |
| CN | 110335043 A | 10/2019 |
| CN | 111200500 A | 5/2020 |
| WO | 2018026727 A1 | 2/2018 |

OTHER PUBLICATIONS

Saad et al, "RouteChain: Towards Blockchain-based Secure and Efficient BGP Routing", 2019, IEEE, p. 210-218.*
He et al, "Securing Route Origin Authorization with Blockchain for Inter-Domain Routing", 2020, IFIP, p. 504-508.*
Sfyrakis et al, "Validating IP Prefixes and AS-Paths with Blockchains", Jul. 2019, p. 1-8.*
Chen et al, "ISRchain: Achieving efficient interdomain secure routing with blockchain", Feb. 20, 2020, ScienceDirect, p. 1-14.*
Li-Der Chou et al., "Blockchain-Based Traffic Event Validation and Trust Verification for VANETs", «IEEE».
Peng Sufang et al., "Detection technology of CA resource abnormal allocation in RPKI based on blockchain", «Cyberspace Security».
Liu Bingyany et al., "Decentralized internet infrastructure", «2018 China Information and Communication Conference».
Ding Ping, "Research and Application of IOT Security Based on Decentralization", «China Master's Theses Full-text Database».
Chen Di et al., "Research on Blockchain-based Interdomain Security Solutions", »Journal of Software».
Dmitri Tsumak. "Securing BGP using blockchain technology", «Securing BGP using blockchain technology».

* cited by examiner

| Block composition | Content included | Size | Description |
|---|---|---|---|
| Block header | A block size, a hash value of a previous block, a hash value of the block body, a block ID and a timestamp | 84 bytes | Consisting of block metadata |
| Block body | A transaction count and a transaction (routing evidence) | Variable length | A number of transactions, and transaction (routing evidence) information recorded in the block |

FIG. 2

BLOCKCHAIN-BASED VERIFIABLE INTER-DOMAIN ROUTING VALIDATION METHOD

CROSS REFERENCES TO RELATED APPLICATIONS

The present application claims foreign priority of Chinese Patent Application No. 201911154492.9, filed on Nov. 22, 2019 in the State Intellectual Property Office of China, the disclosures of all of which are hereby incorporated by reference.

TECHNICAL FIELD

The disclosure relates to a network security technology, and, more particularly, to a method for discovering and solving problems of violating a routing policy caused by routing single-point attack or routing multi-point collusion attack existing in the existing inter-domain routing protocol BGP.

BACKGROUND

Security problems of Internet inter-domain routing have been studied for many years. Most security-related works focus on routing forgery, such as an S-BGP (Secure BGP, Secure Inter-domain Routing Protocol), a SoBGP (Secure Origin BGP, Secure Origin Inter-domain Routing Protocol), IRV (Inter-domain Routing Validation), and the like. The S-BGP ensures information security by validating a routing path attribute based on a certificate in a PKI (Public Key Infrastructure). The SoBGP can only provide origin identity validation, but cannot provide path identity validation. The IRV is a centralized solution, the operations of which are irrelevant to the routing protocol. The IRV requires each AS to report a connection relationship thereof with other ASs to an IRV server. Secure multi-party computation is introduced into the inter-domain routing in related researches, which separates private information into different computing entities (referring to computers and other computing machines), and results are calculated by multiple computing entities. There are also related researches on changing a principle of routing advertisement without revealing a topological structure, and a shortest path can be calculated by backtracking.

A routing single-point attack may be checked by means of multi-node cooperative routing validation; in other words, a routing node cooperates with other routing nodes to jointly validate whether a routing policy is violated. However, the method is realized under the condition that there is only one malicious node in a routing system, and multiple honest nodes are cooperated to check whether a routing violates the routing policy, thus finding a problem of violating the routing policy. If there are multiple malicious nodes, whether the routing violates the routing policy cannot be checked through a multi-node system, because one routing node does not know whether routing collaborative validation information received from other routing nodes is true or not. The problems of violating the routing policy caused by a routing multi-point collusion attack refers to the problems of violating the routing policy caused in the case that multiple malicious routing nodes participate in a routing process, and the attack cannot be detected. No technical literatures about a method to resist such attack are published at present.

SUMMARY

A technical problem to be solved by the disclosure is: aiming at the problems of violating a routing policy caused by routing single-point attack or routing multi-point collusion attack existing in the existing inter-domain routing protocol BGP, a blockchain-based verifiable inter-domain routing validation method is provided to validate published routing information and validate whether the routing information conforms to the routing policy. The disclosure not only can validate the problems of violating the routing policy caused by the single-point routing attack, but also can validate the problem of violating the routing policy caused by the multi-point collusion attack.

The present disclosure adopts the following technical solutions.

In step 1, a blockchain-based verifiable inter-domain routing system is constructed, wherein the blockchain-based verifiable inter-domain routing system consists of a verifiable inter-domain routing subsystem and a routing behavior validation subsystem which are connected via network.

The verifiable inter-domain routing subsystem consists of a plurality of autonomous domains, and each autonomous domain has a plurality of routers. Compared with a routing subsystem commonly used in an existing network, a routing software system of an existing inter-domain router is mainly modified, and a routing behavior validation agent module is added in the routing software system of the inter-domain router, and the routing behavior validation agent module is communicated with other modules of the routing software system through inter-process calls. The routing behavior validation agent module is connected with a routing behavior validation terminal of the routing behavior validation subsystem via a network, the routing behavior validation agent module constructs routing basic information (including an ID of a routing sender, an ID of a routing receiver, a routing sending timestamp, a routing prefix address, a routing operation and routing classification information; wherein the ID of the routing sender is obtained by hashing a source AS number of the routing information; the ID of the routing receiver is obtained by hashing a destination AS number of the routing information; the routing sending timestamp is obtained from a timestamp of the routing information, and the routing prefix address is obtained from a routing prefix field of the routing information; routing operation settings are obtained from a routing operation field of the routing information; the routing classification information is generated according to a path length of the routing information and expressed in 16-bit binary; assuming that the path length is nn, an nn-th binary of the routing classification information is set as 1, and the other bits are set as 0, and nn is a positive integer) and a routing evidence according to routing information sent by the routing software system (referring to a routing message transmitted between routers, and consisting of fields such as a source AS number, a destination AS number, a timestamp, a routing prefix and a routing operation), generates routing validation request information, and sends the routing evidence and the routing validation request information to the routing behavior validation terminal. The routing evidence consists of five parts including the routing basic information, a forward routing evidence PRP, a routing information identifier IDR, a signature and a public key of a routing receiver as well as a signature and a public key of a routing sender, and the forward routing evidence PRP points to one routing evidence already stored in a routing evidence blockchain; the routing information identifier IDR is an unique identifier of the routing information, which replaces the routing information in a routing validation process; the signature of the routing receiver refers to a signature of the routing receiver when receiving the routing information, and the public key of the routing receiver refers to a public key used for asymmetric encryption; the routing behavior validation subsystem uses the signature of the routing receiver and a public key field to validate that the routing receiver really receives the routing information; the signature of the routing receiver refers to the signature of the routing receiver when receiving the routing information, and the public key of the routing receiver refers to a public key used for asymmetric encryption; the routing behavior validation subsystem uses the signature of the routing receiver and the public key field to validate whether contents of the routing evidence are tampered; and the routing evidence signature refers to a signature of the routing sender on the routing information, to guarantee an integrity of the routing information and prevent the routing information from being forged and tampered. The routing validation request information includes routing basic information to be validated.

The routing behavior validation subsystem consists of a routing behavior validation terminal and a routing validation blockchain system. The routing behavior validation terminal is deployed in an autonomous domain (one autonomous domain can be deployed with n routing behavior validation terminals, and n is a positive integer), and the routing behavior validation terminal is connected with the routing behavior validation agent module and the routing validation blockchain system, the routing behavior validation terminal receives the routing evidence and the routing validation request information from the routing behavior validation agent module, constructs a routing evidence validation proposal according to the routing evidence, and sends the routing evidence validation proposal, a routing evidence transaction (a structure of the routing evidence transaction is the same as a transaction structure of a Fabric platform, and contents of the routing evidence transaction include the routing evidence and a signature of each endorsing node) and the routing validation request information to the routing validation blockchain system; and the routing behavior validation terminal consists of a routing evidence processing module and a routing validation request processing module.

The routing validation blockchain system mainly works in three aspects: (1) receiving and processing the routing evidence validation proposal, and validating whether the routing evidence is correct; (2) receiving and processing the routing evidence transaction, packaging the transaction into a block, and saving the block in the routing evidence blockchain; and (3) validating the routing validation request information, and feeding back a validation result to the routing behavior validation agent module.

The routing validation blockchain system is connected with the routing behavior validation terminal, is implemented on the basis of a Fabric blockchain platform, and consists of an endorsing node, an ordering node, a submitting node, the routing evidence blockchain and a configuration file.

The endorsing node is provided with a routing evidence validation chain code, and receives the routing evidence validation proposal and the routing validation request information from the routing behavior validation terminal; the routing evidence validation chain code is a program for validating the routing evidence, which checks whether the routing basic information and the routing evidence signature of the routing evidence are correct, checks whether routing information corresponding to the routing evidence is the best routing, and endorses the routing evidence passing the validation. The ordering node receives the routing evidence transaction sent from the routing behavior validation terminal; the ordering node conducts an consensus operation on the routing evidence transaction, constructs a block after the consensus is completed, and sends the block to the submitting node; the submitting node receives the block from the ordering node and puts the block into the routing evidence blockchain. The routing evidence blockchain consists of blocks, and each block is divided into two parts: a block header and a block body, header information of the block is stored in the block header, which contains a block size, a hash value of a previous block, a hash value of the block body, a block ID and a timestamp, a transaction count and a transaction are stored in the block body, the routing evidence is stored in the transaction, a length of the block body is variable, and the block header is generally 84 bytes. The configuration file is stored on each node. The configuration file stores configuration information of the routing validation blockchain system, the configuration file contains a number of the endorsing node, the ordering node and the submitting node, as well as network topology information of the nodes, including addresses of the nodes and a connection relation between the nodes).

In step 2, the routing behavior validation subsystem is started.

In 2.1, the routing validation blockchain system is started.

In 2.1.1, according to the configuration file in the routing validation blockchain system, the endorsing node, the submitting node and the ordering node with the specified number in the configuration file are started.

In 2.1.2, the endorsing node, the submitting node and the ordering node automatically configure addresses according to address information in the network topology information in the configuration file, and establish a communication connection according to the network topology information in the configuration file.

In 2.1.3, all the endorsing nodes in the routing evidence blockchain set an endorsement policy, wherein the endorsement policy indicates that a routing evidence validation proposal can only be submitted to the ordering node after being endorsed by a specified number of endorsement nodes.

In 2.1.4, the routing evidence blockchain is initialized to be NULL.

In 2.1.5, the ordering node constructs a consensus network according to the network topology information specified in the configuration file; when receiving a routing transaction, all the ordering nodes in the consensus network run a consensus algorithm in parallel such as PBFT (Practical Byzantine Fault Tolerance Algorithm) from a paper *Practical Byzantine Fault Tolerance* of OSDI, an international conference held in 1999, and the like. All the ordering nodes in the consensus network wait a routing evidence transaction sent from the endorsing node.

In 2.1.6, the submitting node waits to receive a block sent from the ordering node.

In 2.2, all the routing behavior validation terminals in all the autonomous domains of the verifiable inter-domain routing subsystem are started, and any routing behavior validation terminal (named Tp) is taken as an example to illustrate a process of starting via a method including the following steps.

In 2.2.1, the routing behavior validation terminal is initialized, including setting autonomous domain information (i.e., an autonomous domain serial number), setting an address (only one) of an endorsing node in the routing validation blockchain system to be connected with the Tp, and setting an address (only one) of an ordering node in the routing validation blockchain system to be connected with the Tp.

In 2.2.2, according to the address of the endorsing node connected with the Tp set in 2.2.1, the Tp conducts identity authentication to the endorsing node. A frequently-used password-based authentication method is employed for the identity authentication; if the identity authentication is passed, a connection application is sent to the endorsing node; then, switch to 2.2.3. If the identity authentication is not passed, the Tp fails to be started; then, switch to 2.2.5.

In 2.2.3, the endorsing node sends a message of "agreeing to establish the connection" to the Tp.

In 2.2.4, the Tp receives the message of "agreeing to establish the connection" from the endorsing node to complete the starting work; then, switch to step 3.

2.2.5: the Tp fails to be started; then, switch to 2.2.1.

In, all the successfully started routing behavior validation terminals in any autonomous domain AS1 of the verifiable inter-domain routing subsystem are set as n1 (assuming that n1 routing behavior validation terminals are provided, $n1 \leq n$, n is a number of the routing behavior validation terminals in the AS1, and n is a positive integer), the information from the verifiable inter-domain routing subsystem is eavesdropped, and whether to establish a connection with the routing behavior validation agent module of the verifiable inter-domain routing subsystem is confirmed.

In 3.1, as the disclosure aims at the inter-domain routing protocol, all the inter-domain routers (assuming M routers are provided, and M is a positive integer) in the verifiable inter-domain routing subsystem start the routing software system.

In 3.2, all the inter-domain routers in the verifiable inter-domain routing subsystem start the routing behavior validation agent module, and the M inter-domain routers send autonomous domain information and router information to the routing behavior validation terminal in parallel. To facilitate description, any inter-domain router (named R1) in any autonomous domain (set as AS1) is taken as an example for illustration, wherein a method is as follows.

In 3.2.1, the routing behavior validation agent module of the R1 is initialized, including setting the router where the routing behavior validation agent module is located (i.e., R1), and the information of the autonomous domain (named AS1) to which the R1 belongs, which is an autonomous domain serial number of the AS1, and setting information of the R1 (i.e., an ID of the R1), and setting IP addresses (i.e., IP addresses of the routing behavior validation terminals) of n routing behavior validation terminals in the AS1.

In 3.2.2, the routing behavior validation agent module sends the information of the autonomous domain AS1 and the information of the router R1 to n successfully started routing behavior validation terminals in the AS1, applies to establish a connection with any successfully started routing behavior validation terminal (named RT1-1) (n routing behavior validation terminals in one autonomous domain may either be connected or not disconnected) in the AS1, and sends the information of the autonomous domain AS1 and the information of the router R1 to the routing behavior validation terminal RT1-1.

In 3.3, a routing validation request processing module of the RT1-1 eavesdrops on a message from the AS1.

In 3.4, the routing validation request processing module of the RT1-1 determines whether the router R1 belongs to the AS1 via the autonomous domain information received from the AS1; if the router R1 belongs to the AS1, records the information of the router R1, and agrees to establish a connection with the routing behavior validation agent module of the R1; then, switch to step 4; if the router R1 does not belong to the AS1, rejects to establish a connection with the routing behavior validation agent module of the R1; then, switch to 3.3.

In step 4, any router (taking R1 as an example) in the autonomous domain AS1 sends routing information RI to one router (set as T, wherein T belongs to AS2) in the autonomous domain AS2.

In step 5, the router T receives the routing information RI from the R1, and sends a routing information confirmation message according to situations via a method including the following steps.

In 5.1, the router T checks a correctness of the routing information RI (a method for a BGP routing protocol to check routing information is employed). If the RI is correct, switch to 5.2; if the RI is wrong, discard the RI; then, switch to step 6.

5.2, the router T constructs and sends a routing information confirmation message RIQ to the router R1 via a method as follows.

In 5.2.1, the routing basic information is extracted from the RI.

In 5.2.2, the router T constructs the routing information confirmation message RIQ according to the RI via a method including: adding a public key and a signature of the router T behind the RI. A method for acquiring the signature of the router T includes: using a private key of the router T to sign the routing basic information of the RI to obtain a signature of the router T on the routing basic information of the RI.

In 5.2.3, the router T sends the RIQ to the router R1; then, switch to step 6.

In step 6, the R1 waits to receive the routing information confirmation message RIQ from the router T. IF the router R1 receives the routing information confirmation message RIQ sent from the router T, switch to step 7. If the routing information confirmation message RIQ is not received in a set time threshold S (the time threshold S is usually set as 10 seconds), switch to step 4.

In step 7, the R1, the routing behavior validation terminal RT1-1 of the AS1 and the routing validation blockchain system mutually cooperate to construct a routing evidence and a routing evidence validation proposal according to a flow from step 8 to step 14, validate the routing evidence validation proposal (including integrity checking and best routing checking), endorse the routing evidence validation proposal, determine whether the routing evidence validation proposal with a signature of the endorsing node satisfies the endorsement policy, generate a routing evidence transaction, conducting consensus ordering on the routing evidence transaction, generate a block, and update the routing validation blockchain; and meanwhile, the router T, a routing behavior validation terminal RT2-1 of the AS2 and the routing validation blockchain system mutually cooperate to construct a routing request validation message according to a flow from step 15 to step 20, check whether the routing request validation message is correct, retrieve whether a routing evidence corresponding to the routing request exists in the routing validation blockchain, and feeds back a validation result of the routing information to the router T.

In step 8, the routing behavior validation agent module of the R1 constructs a routing evidence according to the RI, and sends the routing evidence to the routing behavior validation subsystem via a method including the following steps.

In 8.1, the routing behavior validation agent module of the R1 constructs a routing evidence RE via a method of extracting related contents from the routing information RI to obtain the routing basic information, the forward routing evidence PRP, the routing information identifier IDR, the signature and the public key of the routing receiver as well as the signature and the public key of the routing sender and combine the same into the RE.

In 8.1.1, the basic routing information is constructed, wherein the ID of the routing sender is obtained by hashing the source AS number of the routing information; the ID of the routing receiver is obtained by hashing the destination AS number of the routing information; the routing sending timestamp is obtained from a timestamp of the routing information, and the routing prefix address is obtained from a routing prefix field of the routing information; routing operation settings are obtained from a routing operation field of the routing information; and the routing classification information is generated according to a path length of the routing information and expressed in 16-bit binary; assuming that the path length is nn, an nn-th binary of the routing classification information is set as 1, and the other bits are set as 0, and nn is a positive integer.

In 8.1.2, the forward routing evidence PRP is constructed and pointed to a routing evidence already stored in the routing evidence blockchain, assuming that the routing evidence pointed by the PRP corresponds to routing information RI', which is the routing information received by the router R1 from other routers, then the R1 adds self-information of the R1 behind the RI' to obtain the routing information RI.

In 8.1.3, the routing information identifier IDR is constructed, namely, the ID of the routing sender, the ID of the routing receiver, the routing sending timestamp, the routing prefix address, the routing operation, and a hash value of the routing classification information are combined into the IDR.

In 8.1.4, the signature of the routing receiver when receiving the routing information is used as the signature of the routing receiver, and a self-provided public key of the routing receiver is used as the public key of the routing receiver.

In 8.1.5, the signature of the routing sender when sending the routing evidence is used as the signature of the routing sender, and a self-provided public key of the routing sender is used as the public key of the routing sender.

In 8.2, a routing behavior validation agent module of the router R1 sends the routing evidence RE to the routing behavior validation terminal RT1-1.

In step 9, the routing behavior validation terminal RT1-1 receives the RE from the routing behavior validation agent module of the router R1, constructs the RE into a routing evidence validation proposal (named REA), and sends the REA to an endorsing node (set as BS1) having a connection relation with the RT1-1. A structure of the REA is the same as a proposal structure on various blockchain platforms (such as Fabric) (refer to Chapter 6 of *HyperLedger Fabric Development Practice-Quickly Mastering Blockchain Technology*, by Yang Yi, Electronic Industry Press, 1st Edition, 2018). A proposal construction method (refer to Chapter 6 of *HyperLedger Fabric Development Practice-Quickly Mastering Blockchain Technology*, by Yang Yi, Electronic Industry Press, 1st Edition, 2018) on various blockchain platforms at current (for example, on Fabric) is employed as a REA construction method.

In step 10, the endorsing node BS1 monitors whether the REA is received from the RT1-1; if the REA is received, a completeness of the REA is checked; if the REA is complete, the REA is sent to another K endorsing nodes that are specified in the endorsement policy and connected with the BS1 according to the endorsement policy, wherein K is a positive integer; then, switch to step 11. If the REA is incomplete, switch to step 10 to wait continuously.

In step 11, the K endorsing nodes receiving the REA validate the REA in parallel: extracting the routing evidence from the REA, calling the routing evidence validation chain code to validate the routing evidence, and obtaining K routing evidence validation proposal results, wherein the K endorsing nodes uses the same method to validate the REA, and any endorsing node (set as BSi) in the K endorsing nodes is taken as an example for illustration, wherein a method includes the following steps.

In 11.1, the BSi extracts the routing evidence RE from the REA, wherein a method (refer to Chapter 6 of *HyperLedger Fabric Development Practice-Quickly Mastering Blockchain Technology*, by Yang Yi, Electronic Industry Press, 1st Edition, 2018) of extracting data from proposals on various blockchain platforms (such as Fabric) is employed as a method of extracting the routing evidence.

In 11.2, the BSi executes the routing evidence validation chain code to validate the RE via a method as follows.

In 11.2.1, routing basic information of the RE is checked via a method including the following steps.

In 11.2.1.1, the forward routing evidence PRP contained in the RE is checked whether to exist in the routing validation blockchain; if not, the RE is discarded; then, switch to 11.5; if yes, a routing sending timestamp in the PRP contained in the routing validation blockchain is determined whether to be earlier than a routing sending timestamp in the RE; if yes, switch to 11.2.1.2; if not, the RE is discarded; then, switch to 11.5.

In 11.2.1.2, a routing prefix address in the RE is checked whether to be the same as a routing prefix address in the PRP included in the routing validation blockchain; if yes, switch to 11.2.1.3; if not, the RE is discarded; then, switch to 11.5.

In 11.2.1.3, routing classification information in the RE is checked whether to be consistent with routing classification information in the PRP included in the routing validation blockchain; if yes, switch to 11.2.2; if not, the RE is discarded; then, switch to 11.5.

In 11.2.2, a signature of the RE is checked via a method including the following steps.

In 11.2.2.1, a public key of a routing sender of the RE is used to check whether a signature of the routing sender is correct; if yes, switch to 11.2.2.2; if not, the RE is discarded; then, switch to 11.5. A method of using the public key of the routing sender of the RE to check whether the signature of the routing sender is correct includes: using the public key of the routing sender to conduct a hash operation on contents of the RE, and comparing whether a result of the hash operation is consistent with the signature of the routing sender of the RE.

In 11.2.2.2, a public key of a routing receiver of the RE is used to check whether a signature of the routing sender is correct. If yes, switch to 11.2.3; if not, the RE is discarded; then, switch to 11.5.

In 11.2.3, routing information corresponding to the RE is checked whether to be the best routing via a method including the following step.

The routing validation blockchain is searched and the R1 (the routing sender at the moment) is extrapolated whether to receive a routing better than the current routing to be validated (i.e., the routing in the routing information corresponding to the RE) via a method as follows.

The ID of the R1 and the routing prefix address are used as indexes to retrieve in the routing validation blockchain and check whether a routing evidence satisfying index conditions exists.

In 11.2.3.1, if a routing evidence RE' is found in the routing validation blockchain, satisfying that routing classification information of the RE' is better than that of the RE (namely, a path length of the routing information corresponding to the RE' is smaller than that of the routing information corresponding to the RE), a router once is proved to send a better routing to the R1, but the R1 does not send the routing information to the routing receiver T, namely, the routing information corresponding to the RE is not the best routing, the RE is discarded; then, switch to 11.5

In 11.2.3.2, if the routing evidence satisfying the index conditions is not found in the routing validation blockchain, indicating that the routing information sent by the routing sender R1 to the routing receiver T is the best routing, and the RE passes the best routing validation; then, switch to 11.3.

In 11.3, the BSi endorses the routing evidence validation proposal REA, and generates a routing evidence validation proposal result, wherein an endorsing method of various blockchain platforms at current (such as Fabric) is adopted as an endorsing method, and contents of the routing evidence validation proposal result are the routing evidence validation proposal REA and a signature of the endorsing node BSi.

In 11.4, the BSi sends the routing evidence validation proposal result with the signature of the BSi (indicating that the routing evidence validation proposal passes the validation at the moment) to the routing behavior validation terminal RT1-1; then, switch to step 12.

In 11.5, the BSi generates a routing evidence validation proposal result with a signature field of the endorsing node being NULL (indicating that the routing evidence validation proposal fails to pass the validation at the moment), and sends the routing evidence validation proposal result to the routing behavior validation terminal RT1-1; then, switch to step 12.

In step 12, the routing behavior validation terminal RT1-1 successively receives the routing evidence validation proposal results from the K endorsing nodes, and determines whether the validated routing evidence validation proposals in the routing evidence validation proposal results successively received from the K endorsing nodes satisfy the endorsement policy via a method including the following steps.

In 12.1, a number of the routing evidence validation proposal results with the signature field of the endorsing node in the successively received K routing evidence validation proposal results is checked whether to be greater than or equal to K1 (the K1 is stipulated in the endorsement policy, that is, the routing evidences signed by at least K1 endorsement nodes can be only submitted to the ordering node, and $1 \leq K1 \leq K$. If the number of the routing evidence validation proposal results is greater than or equal to the K1, switch to 12.2; if the number of the routing evidence validation proposal results is not equal to the K1, indicating that less than K1 endorsing nodes endorse and sign the routing evidence validation proposals, and the endorsement policy is not satisfied, which means that the round of inter-domain routing evidences cannot be stored in the blockchain; then, switch to step 21.

In 12.2, the routing behavior validation terminal RT1-1 packages the K1 routing evidence validation proposal results into a routing evidence transaction (a structure of the routing evidence transaction is the same as the Fabric platform, except that transaction contents in the structure of the routing evidence transaction store the routing evidence and the signature of each endorsing node), and a current method of packaging transactions on various blockchain platforms (such as Fabric) is employed. The routing evidence transaction is sent to any ordering node (named PX1) communicated with the RT1-1; then, switch to step 13.

In step 13, the ordering node PX1 determines whether the routing evidence transaction is received from the RT1-1; if the routing evidence transaction is received, switch to 13.1; if the routing evidence transaction is not received, switch to step 13 to wait.

In 13.1, the transaction content is checked whether to conform to the endorsement policy (a number of the signed endorsing nodes is checked); if the transaction content does not confirm to the endorsement policy, switch to 13.5. If the transaction content confirms to the endorsement policy, switch to 13.2.

In 13.2, the ordering node PX1 sends the routing evidence transaction to all other ordering nodes in the routing validation blockchain system.

In 13.3, all the ordering nodes (including PX1) in the routing validation blockchain system conducts consensus ordering on the received routing evidence transaction (a consensus algorithm PBFT published by the blockchain Fabric is employed). If a consensus is reached, switch to 13.4;

if no consensus is reached, switch to 13.5.

In 13.4, all the ordering nodes in the routing validation blockchain system generate the routing evidence transaction into a new block using a block generation method, wherein the N ordering nodes generates the same block. A current block generation method of various blockchain platforms (such as Fabric) is employed, and the block is broadcasted to all the submitting nodes in the routing validation blockchain system; then, switch to step 14.

In 13.5, all the ordering nodes in the routing validation blockchain system discard the routing evidence transaction; then, switch to step 21.

In step 14, all the submitting nodes in the routing validation blockchain system receive the new block from the ordering nodes connected therewith, add the block to a routing evidence validation blockchain, and check whether the transaction in the block is valid (validate whether the signature of the transaction is valid and whether the transaction satisfies the endorsement policy). If the transaction in the block is valid by checking, indicating that the transaction is signed and endorsed by the endorsing node, all the submitting nodes in the routing validation blockchain system add the block into a local routing validation blockchain; then, switch to step 21. If the transaction is invalid by checking, the block is discarded; then, switch to 21.

In step 15, the router T validates the routing information RI via a method as follows.

In 15.1, a routing behavior validation agent module of the router T constructs a routing validation request, and sends the routing validation request to a routing behavior validation terminal of the autonomous domain (set as AS2) to which the T belongs via a method as follows.

In 15.1.1, the routing behavior validation agent module extracts the routing basic information from the RI.

In 15.1.2, the routing behavior validation agent module constructs a routing request validation message RIQB of the RI. Contents of the RIQB include routing basic information of the RI, a public key of the router T, and a signature of the router T on the routing basic information of the RI.

In 15.1.3, the routing behavior validation agent module sends the RIQB to the routing behavior validation terminal (set as RT2-1) of the AS2.

In step 16, the routing behavior validation terminal RT2-1 of the AS2 receives the RIQB from the router T, and checks whether a signature of the RIQB is correct, wherein a method for determining the signature includes: using the public key of the router T to conduct a hash operation on contents of the RIQB, and comparing whether a result of the hash operation is consistent with the signature of the router T of the RIQB. If the result of the hash operation is consistent with the signature of the router T of the RIQB, indicating that the signature is correct; then, switch to step 18; if the result of the hash operation is inconsistent with the signature of the router T of the RIQB, indicating that the signature is incorrect; then, switch to step 17.

In step 17, the routing request validation message RIQB is discarded; then, switch to step 21.

In step 18, any endorsing node of the routing validation blockchain system connected with the RT2-1 receives the RIQB, and validates the RIQB.

In 18.1, the signature of the RIQB is checked whether to be correct; if the signature is correct, switch to 18.2; if the signature is incorrect, switch to step 17.

In 18.2, the routing information identifier IDR is extracted from the RIQB.

In 18.3, the IDR is retrieved from the routing evidence blockchain, if an matched entry identical to the IDR is found in the routing evidence blockchain, then the validation is passed, switch to 18.4; otherwise, the validation is failed, switch to 18.6.

In 18.4, a routing information validation success message RIYC is constructed, namely, a validation success tag and the signature of the endorsing node are added at a tail of the RIQB, and the RIYC is fed back to the routing behavior validation terminal RT2-1.

In 18.5, the RT2-1 forwards the RIYC to the router T; then, switch to step 19.

In 18.6, a routing information validation failure message RIYS is constructed, namely, a validation failure tag and the signature of the endorsing node are added at the tail of the RIQB, and the routing information validation failure message is fed back to the routing behavior validation terminal RT2-1.

In 18.7, the RT2-1 forwards the RIYS to the router T; then, switch to step 20.

In step 19, the router T receives the RIYC, considers that the routing information RI conforms to the routing policy, learns a new routing from the RI, and adds the new routing to a routing table. Methods of learning routing and adding the routing table are the same as the well-known methods of learning routing and adding the routing table. Switch to step 21.

In step 20, the router T receives the RIYS, considers that the routing information RI violates the routing policy, and discards the RI; then, switch to step 21.

In step 21, switch to step 4.

The disclosure can achieve the following technical effects:

1. According to the disclosure, the routing evidence is validated and stored in the routing evidence blockchain through the step 8 to step 14; from step 15 to step 20, with reference to the routing evidence blockchain, whether the routing information sent by a router meets the routing policy can be checked, thus discovering the violation of the routing policy caused by single-point and multi-point attacks.

2. When the routing validation is carried out from the step 8 to step 14, the routing evidence is used instead of the routing information to participate in the routing validation process, thus protecting a privacy safety of routing data and protecting the routing privacy information.

3. According to the disclosure, the blockchain is employed to store routing evidence, which enables a "blockchain-based verifiable inter-domain routing validation system based on blockchain" provided by the disclosure to have better security and robustness, and improves a difficulty of forging the routing evidence; through the cooperation of the blockchain system and the routing behavior validation terminal, the problem of violating the routing policy caused by the single-point attack and the multi-point collusion attack can be checked, and the problem that multi-point collusion attack is difficult to be found in the inter-domain routing at present can be solved.

BRIEF DESCRIPTION OF THE DRAWINGS

FIG. 2 is a block data structure diagram of the disclosure; and

DETAILED DESCRIPTION

Figure 3A:
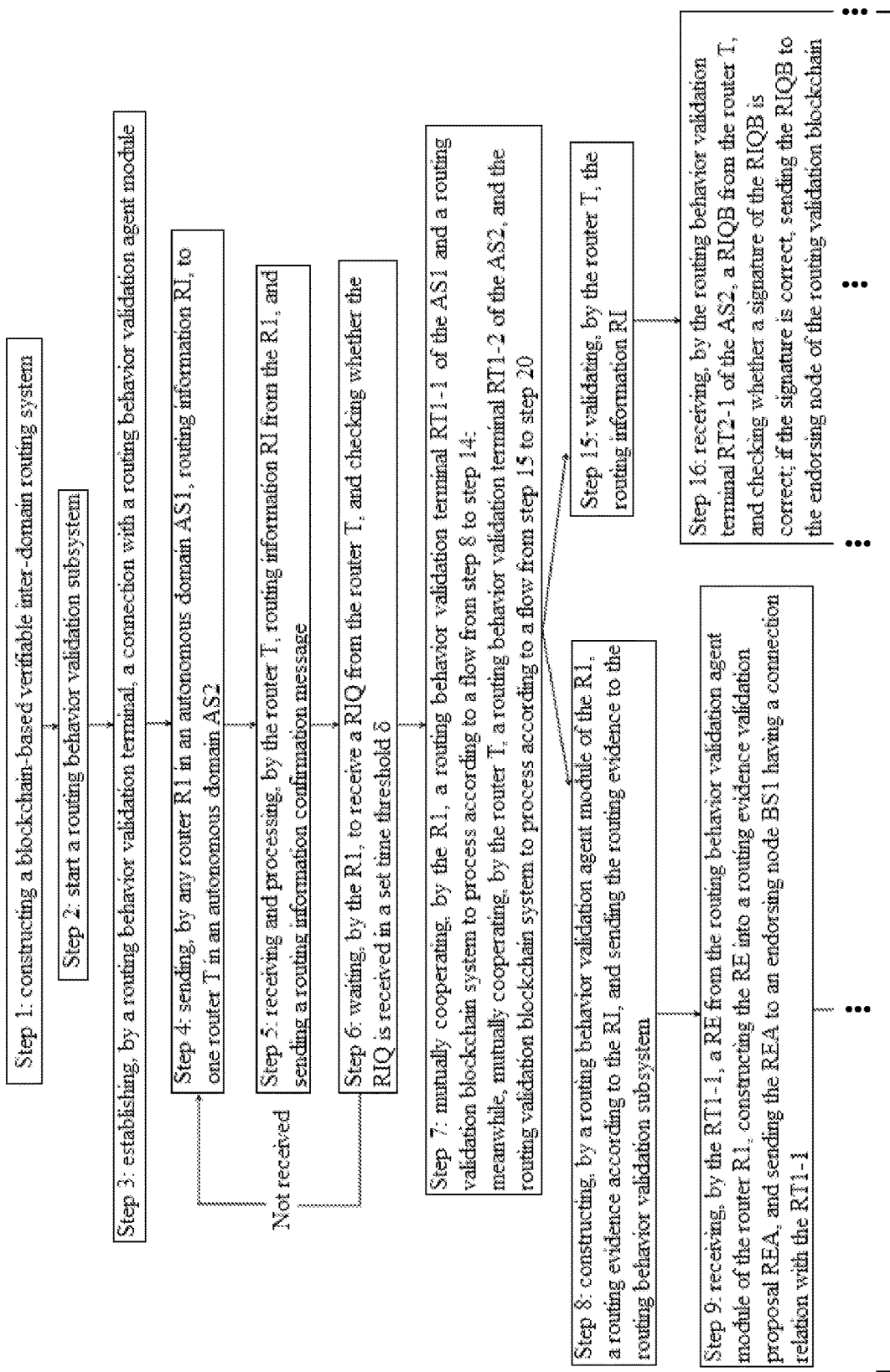
FIG. 3A and FIG. 3B are an overall flow chart of the disclosure.
Figure 3B:
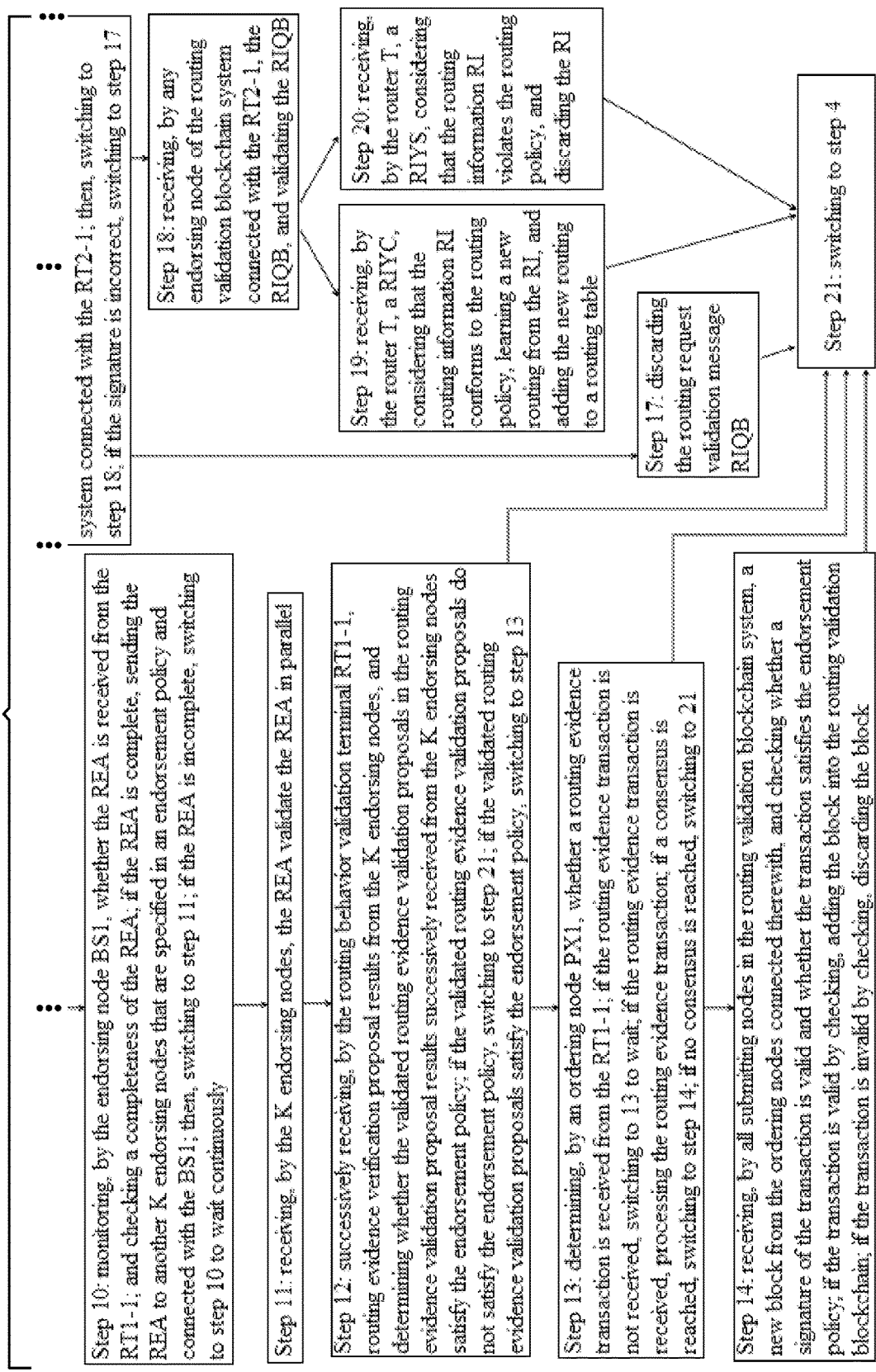

FIG. 3A and FIG. 3B are an overall flow chart of the disclosure. As shown in FIG. 3A and FIG. 3B, the disclosure includes the following steps.

Figure 1A:
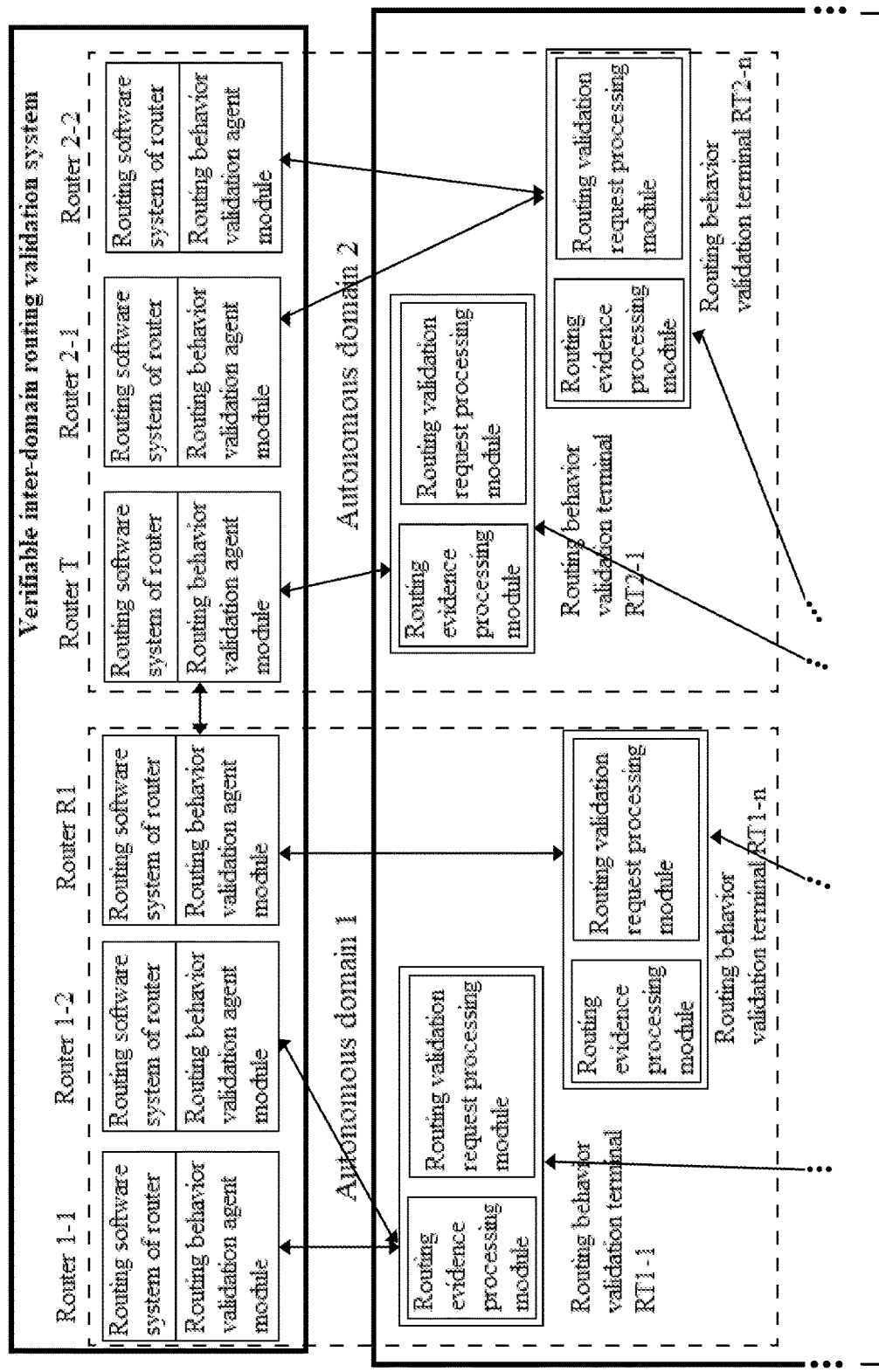
FIG. 1A and FIG. 1B are a blockchain-based verifiable inter-domain routing system according to the disclosure.
Figure 1B:
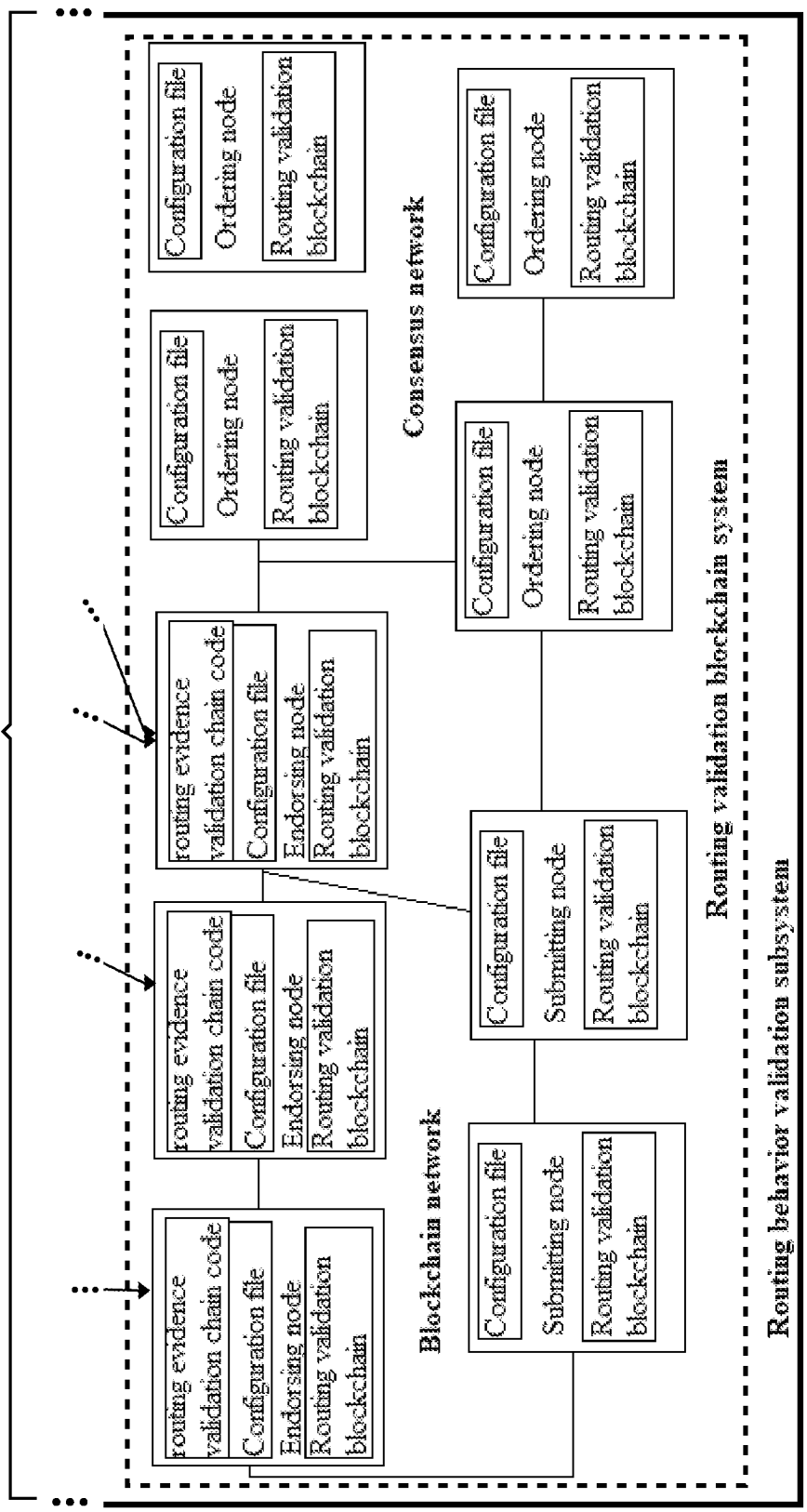

In step 1, a blockchain-based verifiable inter-domain routing system is constructed, wherein the blockchain-based verifiable inter-domain routing system, as shown in FIG. 1A and FIG. 1B, consists of a verifiable inter-domain routing subsystem and a routing behavior validation subsystem which are connected via network.

The verifiable inter-domain routing subsystem consists of a plurality of autonomous domains, and each autonomous domain has a plurality of routers. A routing behavior validation agent module is added in a routing software system of an inter-domain router, and the routing behavior validation agent module is communicated with other modules of the routing software system through inter-process calls. The routing behavior validation agent module is connected with a routing behavior validation terminal of the routing behavior validation subsystem via a network, the routing behavior validation agent module constructs routing basic information and a routing evidence according to routing information sent by the routing software system, generates routing validation request information, and sends the routing evidence and the routing validation request information to the routing behavior validation terminal. The routing evidence consists of five parts including the routing basic information, a forward routing evidence PRP, a routing information identifier IDR, a signature and a public key of a routing receiver as well as a signature and a public key of a routing sender. The routing validation request information includes routing basic information to be validated.

The routing behavior validation subsystem consists of a routing behavior validation terminal and a routing validation blockchain system. The routing behavior validation terminal is deployed in an autonomous domain (one autonomous domain is deployed with n routing behavior validation terminals, and n is a positive integer), and the routing behavior validation terminal is connected with the routing behavior validation agent module and the routing validation blockchain system, the routing behavior validation terminal receives the routing evidence and the routing validation request information from the routing behavior validation agent module, constructs a routing evidence validation proposal according to the routing evidence, and sends the routing evidence validation proposal, a routing evidence transaction (contents of the routing evidence transaction include the routing evidence and a signature of each endorsing node) and the routing validation request information to the routing validation blockchain system; and the routing behavior validation terminal consists of a routing evidence processing module and a routing validation request processing module.

The routing validation blockchain system mainly works in three aspects: (1) receiving and processing the routing evidence validation proposal, and validating whether the routing evidence is correct; (2) receiving and processing the routing evidence transaction, packaging the transaction into a block, and saving the block in the routing evidence blockchain; and (3) validating the routing validation request information, and feeding back a validation result to the routing behavior validation agent module.

The routing validation blockchain system is connected with the routing behavior validation terminal, is implemented on the basis of a Fabric blockchain platform, and consists of an endorsing node, an ordering node, a submitting node, the routing evidence blockchain and a configuration file.

The endorsing node is provided with a routing evidence validation chain code, and receives the routing evidence validation proposal and the routing validation request information from the routing behavior validation terminal; the routing evidence validation chain code is a program for validating the routing evidence, which checks whether the routing basic information and the routing evidence signature of the routing evidence are correct, checks whether routing information corresponding to the routing evidence is the best routing, and endorses the routing evidence passing the validation. The ordering node receives the routing evidence transaction sent from the routing behavior validation terminal; the ordering node conducts an consensus operation on the routing evidence transaction, constructs a block after the consensus is completed, and sends the block to the submitting node; the submitting node receives the block from the ordering node and puts the block into the routing evidence blockchain. The routing evidence blockchain consists of blocks, and each block, as shown in FIG. 2, is divided into two parts: a block header and a block body, header information of the block is stored in the block header, which contains a block size, a hash value of a previous block, a hash value of the block body, a block ID and a timestamp, a transaction count and a transaction are stored in the block body, the routing evidence is stored in the transaction, a length of the block body is variable, and the block header is generally 84 bytes. The configuration file is stored on each node. The configuration file stores configuration information of the routing validation blockchain system, the configuration file contains a number of the endorsing node, the ordering node and the submitting node, as well as network topology information of the nodes, including addresses of the nodes and a connection relation between the nodes).

In step 2, the routing behavior validation subsystem is started.

In 2.1, the routing validation blockchain system is started.

In 2.1.1, according to the configuration file in the routing validation blockchain system, the endorsing node, the submitting node and the ordering node with the specified number in the configuration file are started.

In 2.1.2, the endorsing node, the submitting node and the ordering node automatically configure addresses according to address information in the network topology information in the configuration file, and establish a communication connection according to the network topology information in the configuration file.

In 2.1.3, all the endorsing nodes in the routing evidence blockchain set an endorsement policy, wherein the endorsement policy indicates that a routing evidence validation proposal can only be submitted to the ordering node after being endorsed by a specified number of endorsement nodes.

In 2.1.4, the routing evidence blockchain is initialized to be NULL.

In 2.1.5, the ordering node constructs a consensus network according to the network topology information specified in the configuration file. All the ordering nodes in the consensus network wait a routing evidence transaction sent from the endorsing node.

In 2.1.6, the submitting node waits to receive a block sent from the ordering node.

In 2.2, all the routing behavior validation terminals in all the autonomous domains of the verifiable inter-domain routing subsystem are started, and any routing behavior validation terminal (named Tp) is taken as an example to illustrate a process of starting via a method including the following steps.

In 2.2.1, the routing behavior validation terminal is initialized, including setting autonomous domain information (i.e., an autonomous domain serial number), setting an address (only one) of an endorsing node in the routing validation blockchain system to be connected with the Tp, and setting an address (only one) of an ordering node in the routing validation blockchain system to be connected with the Tp.

In 2.2.2, according to the address of the endorsing node connected with the Tp set in 2.2.1, the Tp conducts identity authentication to the endorsing node. A frequently-used password-based authentication method is employed for the identity authentication; if the identity authentication is passed, a connection application is sent to the endorsing node; then, switch to 2.2.3. If the identity authentication is not passed, the Tp fails to be started; then, switch to 2.2.5.

22 In 2.2.3, the endorsing node sends a message of "agreeing to establish the connection" to the Tp.

In 2.2.4, the Tp receives the message of "agreeing to establish the connection" from the endorsing node to complete the starting work; then, switch to step 3.

2.2.5: the Tp fails to be started; then, switch to 2.2.1.

In, all the successfully started routing behavior validation terminals in any autonomous domain AS1 of the verifiable inter-domain routing subsystem are set as n1 (assuming that n1 routing behavior validation terminals are provided, n1≤n, n is a number of the routing behavior validation terminals in the AS1, and n is a positive integer), the information from the verifiable inter-domain routing subsystem is eavesdropped, and whether to establish a connection with the routing behavior validation agent module of the verifiable inter-domain routing subsystem is confirmed.

In 3.1, as the disclosure aims at the inter-domain routing protocol, all the inter-domain routers (assuming M routers are provided, and M is a positive integer) in the verifiable inter-domain routing subsystem start the routing software system.

In 3.2, all the inter-domain routers in the verifiable inter-domain routing subsystem start the routing behavior validation agent module, and the M inter-domain routers send autonomous domain information and router information to the routing behavior validation terminal in parallel, wherein a method for any inter-domain router (named R1) in any autonomous domain (set as AS1) to send the autonomous domain information and the router information to the routing behavior validation terminal is as follows.

In 3.2.1, the routing behavior validation agent module of the R1 is initialized, including setting the router where the routing behavior validation agent module is located (i.e., R1), and the information of the autonomous domain (named AS1) to which the R1 belongs, which is an autonomous domain serial number of the AS1, and setting information of the R1 (i.e., an ID of the R1), and setting IP addresses (i.e., IP addresses of the routing behavior validation terminals) of n routing behavior validation terminals in the AS1.

In 3.2.2, the routing behavior validation agent module sends the information of the autonomous domain AS1 and the information of the router R1 to n1 successfully started routing behavior validation terminals in the AS1, applies to establish a connection with any successfully started routing behavior validation terminal (named RT1-1) in the AS1, and sends the information of the autonomous domain AS1 and the information of the router R1 to the routing behavior validation terminal RT1-1.

In 3.3, a routing validation request processing module of the RT1-1 eavesdrops on a message from the AS1.

In 3.4, the routing validation request processing module of the RT1-1 determines whether the router R1 belongs to the AS1 via the autonomous domain information received from the AS1; if the router R1 belongs to the AS1, records the information of the router R1, and agrees to establish a connection with the routing behavior validation agent module of the R1; then, switch to step 4; if the router R1 does not belong to the AS1, rejects to establish a connection with the routing behavior validation agent module of the R1; then, switch to 3.3.

In step 4, any router (taking R1 as an example) in the autonomous domain AS1 sends routing information RI to one router (set as T, wherein T belongs to AS2) in the autonomous domain AS2.

In step 5, the router T receives the routing information RI from the R1, and sends a routing information confirmation message according to situations via a method including the following steps.

In 5.1, the router T checks a correctness of the routing information RI. If the RI is correct, switch to 5.2; if the RI is wrong, discard the RI; then, switch to step 6.

5.2, the router T constructs and sends a routing information confirmation message RIQ to the router R1 via a method as follows.

In 5.2.1, the routing basic information is extracted from the RI.

In 5.2.2, the router T constructs the routing information confirmation message RIQ according to the RI via a method including: adding a public key and a signature of the router T behind the RI. A method for acquiring the signature of the router T includes: using a private key of the router T to sign the routing basic information of the RI to obtain a signature of the router T on the routing basic information of the RI.

In 5.2.3, the router T sends the RIQ to the router R1; then, switch to step 6.

In step 6, the R1 waits to receive the routing information confirmation message RIQ from the router T. IF the router R1 receives the routing information confirmation message RIQ sent from the router T, switch to step 7. If the routing information confirmation message RIQ is not received in a set time threshold S (the time threshold S is set as 10 seconds), switch to step 4.

In step 7, the R1, the routing behavior validation terminal RT1-1 of the AS1 and the routing validation blockchain system mutually cooperate to construct a routing evidence and a routing evidence validation proposal according to a flow from step 8 to step 14, validate the routing evidence validation proposal (including integrity checking and best routing checking), endorse the routing evidence validation proposal, determine whether the routing evidence validation proposal with a signature of the endorsing node satisfies the endorsement policy, generate a routing evidence transaction, conducting consensus ordering on the routing evidence transaction, generate a block, and update the routing validation blockchain; and meanwhile, the router T, a routing behavior validation terminal RT2-1 of the AS2 and the routing validation blockchain system mutually cooperate to construct a routing request validation message according to a flow from step 15 to step 20, check whether the routing request validation message is correct, retrieve whether a routing evidence corresponding to the routing request exists in the routing validation blockchain, and feeds back a validation result of the routing information to the router T.

In step 8, the routing behavior validation agent module of the R1 constructs a routing evidence according to the RI, and sends the routing evidence to the routing behavior validation subsystem via a method including the following steps.

In 8.1, the routing behavior validation agent module of the R1 constructs a routing evidence RE via a method of extracting related contents from the routing information RI to obtain the routing basic information, the forward routing evidence PRP, the routing information identifier IDR, the signature and the public key of the routing receiver as well as the signature and the public key of the routing sender and combine the same into the RE.

In 8.1.1, the basic routing information is constructed, wherein the ID of the routing sender is obtained by hashing the source AS number of the routing information; the ID of the routing receiver is obtained by hashing the destination AS number of the routing information; the routing sending timestamp is obtained from a timestamp of the routing information, and the routing prefix address is obtained from a routing prefix field of the routing information; routing operation settings are obtained from a routing operation field of the routing information; and the routing classification information is generated according to a path length of the routing information and expressed in 16-bit binary; assuming that the path length is nn, an nn-th binary of the routing classification information is set as 1, and the other bits are set as 0, and nn is a positive integer.

In 8.1.2, the forward routing evidence PRP is constructed and pointed to a routing evidence already stored in the routing evidence blockchain, assuming that the routing evidence pointed by the PRP corresponds to routing information RI', which is the routing information received by the router R1 from other routers, then the RI adds self-information of the R1 behind the RI' to obtain the routing information RI.

In 8.1.3, the routing information identifier IDR is constructed, namely, the ID of the routing sender, the ID of the routing receiver, the routing sending timestamp, the routing prefix address, the routing operation, and a hash value of the routing classification information are combined into the IDR.

In 8.1.4, the signature of the routing receiver when receiving the routing information is used as the signature of the routing receiver, and a self-provided public key of the routing receiver is used as the public key of the routing receiver.

In 8.1.5, the signature of the routing sender when sending the routing evidence is used as the signature of the routing sender, and a self-provided public key of the routing sender is used as the public key of the routing sender.

In 8.2, a routing behavior validation agent module of the router R1 sends the routing evidence RE to the routing behavior validation terminal RT1-1.

In step 9, the routing behavior validation terminal RT1-1 receives the RE from the routing behavior validation agent module of the router R1, constructs the RE into a routing evidence validation proposal (named REA), and sends the REA to an endorsing node (set as BS1) having a connection relation with the RT1-1. A structure of the REA is the same as a proposal structure on various blockchain platforms (such as Fabric). A proposal construction method on various blockchain platforms at current (for example, on Fabric) is employed as a REA construction method.

In step 10, the endorsing node BS1 monitors whether the REA is received from the RT1-1; if the REA is received, a completeness of the REA is checked; if the REA is complete, the REA is sent to another K endorsing nodes that are specified in the endorsement policy and connected with the BS1 according to the endorsement policy, wherein K is a positive integer; then, switch to step 11. If the REA is incomplete, switch to step 10 to wait continuously.

In step 11, the K endorsing nodes receiving the REA validate the REA in parallel: extracting the routing evidence from the REA, calling the routing evidence validation chain code to validate the routing evidence, and obtaining K routing evidence validation proposal results, wherein the K endorsing nodes uses the same method to validate the REA, and any endorsing node (set as BSi) in the K endorsing nodes is taken as an example for illustration, wherein a method includes the following steps.

In 11.1, the BSi extracts the routing evidence RE from the REA, wherein a method of extracting data from proposals on various blockchain platforms (such as Fabric) is employed as a method of extracting the routing evidence.

In 11.2, the BSi executes the routing evidence validation chain code to validate the RE via a method as follows.

In 11.2.1, routing basic information of the RE is checked via a method including the following steps.

In 11.2.1.1, the forward routing evidence PRP contained in the RE is checked whether to exist in the routing validation blockchain; if not, the RE is discarded; then, switch to 11.5; if yes, a routing sending timestamp in the PRP contained in the routing validation blockchain is determined whether to be earlier than a routing sending timestamp in the RE; if yes, switch to 11.2.1.2; if not, the RE is discarded; then, switch to 11.5.

In 11.2.1.2, a routing prefix address in the RE is checked whether to be the same as a routing prefix address in the PRP included in the routing validation blockchain; if yes, switch to 11.2.1.3; if not, the RE is discarded; then, switch to 11.5.

In 11.2.1.3, routing classification information in the RE is checked whether to be consistent with routing classification information in the PRP included in the routing validation blockchain; if yes, switch to 11.2.2; if not, the RE is discarded; then, switch to 11.5.

In 11.2.2, a signature of the RE is checked via a method including the following steps.

In 11.2.2.1, a public key of a routing sender of the RE is used to check whether a signature of the routing sender is correct; if yes, switch to 11.2.2.2; if not, the RE is discarded; then, switch to 11.5. A method of using the public key of the routing sender of the RE to check whether the signature of the routing sender is correct includes: using the public key of the routing sender to conduct a hash operation on contents of the RE, and comparing whether a result of the hash operation is consistent with the signature of the routing sender of the RE.

In 11.2.2.2, a public key of a routing receiver of the RE is used to check whether a signature of the routing sender is correct. If yes, switch to 11.2.3; if not, the RE is discarded; then, switch to 11.5.

In 11.2.3, routing information corresponding to the RE is checked whether to be the best routing via a method including the following step.

The routing validation blockchain is searched and the R1 (the routing sender at the moment) is extrapolated whether to receive a routing better than the current routing to be validated (i.e., the routing in the routing information corresponding to the RE) via a method as follows.

The ID of the R1 and the routing prefix address are used as indexes to retrieve in the routing validation blockchain and check whether a routing evidence satisfying index conditions exists.

In 11.2.3.1, if a routing evidence RE' is found in the routing validation blockchain, satisfying that routing classification information of the RE' is better than that of the RE (namely, a path length of the routing information corresponding to the RE' is smaller than that of the routing information corresponding to the RE), a router once is proved to send a better routing to the R1, but the R1 does not send the routing information to the routing receiver T, namely, the routing information corresponding to the RE is not the best routing, the RE is discarded; then, switch to 11.5

In 11.2.3.2, if the routing evidence satisfying the index conditions is not found in the routing validation blockchain, indicating that the routing information sent by the routing sender R1 to the routing receiver T is the best routing, and the RE passes the best routing validation; then, switch to 11.3.

In 11.3, the BSi endorses the routing evidence validation proposal REA, and generates a routing evidence validation proposal result, wherein an endorsing method of various blockchain platforms at current (such as Fabric) is adopted as an endorsing method, and contents of the routing evidence validation proposal result are the routing evidence validation proposal REA and a signature of the endorsing node BSi.

In 11.4, the BSi sends the routing evidence validation proposal result with the signature of the BSi (indicating that the routing evidence validation proposal passes the validation at the moment) to the routing behavior validation terminal RT1-1; then, switch to step 12.

In 11.5, the BSi generates a routing evidence validation proposal result with a signature field of the endorsing node being NULL (indicating that the routing evidence validation proposal fails to pass the validation at the moment), and sends the routing evidence validation proposal result to the routing behavior validation terminal RT1-1; then, switch to step 12.

In step 12, the routing behavior validation terminal RT-1 successively receives the routing evidence validation proposal results from the K endorsing nodes, and determines whether the validated routing evidence validation proposals in the routing evidence validation proposal results successively received from the K endorsing nodes satisfy the endorsement policy via a method including the following steps.

In 12.1, a number of the routing evidence validation proposal results with the signature field of the endorsing node in the successively received K routing evidence validation proposal results is checked whether to be greater than or equal to K1 (the K1 is stipulated in the endorsement policy, that is, the routing evidences signed by at least K1 endorsement nodes can be only submitted to the ordering node, and 1≤K1≤K. If the number of the routing evidence validation proposal results is greater than or equal to the K1, switch to 12.2; if the number of the routing evidence validation proposal results is not equal to the K1, indicating that less than K1 endorsing nodes endorse and sign the routing evidence validation proposals, and the endorsement policy is not satisfied, which means that the round of inter-domain routing evidences cannot be stored in the blockchain; then, switch to step 21.

In 12.2, the routing behavior validation terminal RT1-1 packages the K1 routing evidence validation proposal results into a routing evidence transaction (a structure of the routing evidence transaction is the same as the Fabric platform, except that transaction contents in the structure of the routing evidence transaction store the routing evidence and the signature of each endorsing node), and a current method of packaging transactions on various blockchain platforms (such as Fabric) is employed. The routing evidence transaction is sent to any ordering node (named PX1) communicated with the RT1-1; then, switch to step 13.

In step 13, the ordering node PX1 determines whether the routing evidence transaction is received from the RT1-1; if the routing evidence transaction is received, switch to 13.1; if the routing evidence transaction is not received, switch to step 13 to wait.

In 13.1, the transaction content is checked whether to conform to the endorsement policy (a number of the signed endorsing nodes is checked); if the transaction content does not confirm to the endorsement policy, switch to 13.5. If the transaction content confirms to the endorsement policy, switch to 13.2.

In 13.2, the ordering node PX1 sends the routing evidence transaction to all other ordering nodes in the routing validation blockchain system.

In 13.3, all the ordering nodes (including PX1) in the routing validation blockchain system conducts consensus ordering on the received routing evidence transaction (a consensus algorithm PBFT published by the blockchain Fabric is employed). If a consensus is reached, switch to 13.4;
if no consensus is reached, switch to 13.5.

In 13.4, all the ordering nodes in the routing validation blockchain system generate the routing evidence transaction into a new block using a block generation method, wherein the N ordering nodes generates the same block. A current block generation method of various blockchain platforms (such as Fabric) is employed, and the block is broadcasted to all the submitting nodes in the routing validation blockchain system; then, switch to step 14.

In 13.5, all the ordering nodes in the routing validation blockchain system discard the routing evidence transaction; then, switch to step 21.

In step 14, all the submitting nodes in the routing validation blockchain system receive the new block from the ordering nodes connected therewith, add the block to a routing evidence validation blockchain, and check whether the transaction in the block is valid (validate whether the signature of the transaction is valid and whether the transaction satisfies the endorsement policy). If the transaction in the block is valid by checking, indicating that the transaction is signed and endorsed by the endorsing node, all the submitting nodes in the routing validation blockchain system add the block into a local routing validation blockchain; then, switch to step 21. If the transaction is invalid by checking, the block is discarded; then, switch to 21.

In step 15, the router T validates the routing information RI via a method as follows.

In 15.1, a routing behavior validation agent module of the router T constructs a routing validation request, and sends the routing validation request to a routing behavior validation terminal of the autonomous domain (set as AS2) to which the T belongs via a method as follows.

In 15.1.1, the routing behavior validation agent module extracts the routing basic information from the RI.

In 15.1.2, the routing behavior validation agent module constructs a routing request validation message RIQB of the RI. Contents of the RIQB include routing basic information of the RI, a public key of the router T, and a signature of the router T on the routing basic information of the RI.

In 15.1.3, the routing behavior validation agent module sends the RIQB to the routing behavior validation terminal (set as RT2-1) of the AS2.

In step 16, the routing behavior validation terminal RT2-1 of the AS2 receives the RIQB from the router T, and checks whether a signature of the RIQB is correct, wherein a method for determining the signature includes: using the public key of the router T to conduct a hash operation on contents of the RIQB, and comparing whether a result of the hash operation is consistent with the signature of the router T of the RIQB. If the result of the hash operation is consistent with the signature of the router T of the RIQB, indicating that the signature is correct; then, switch to step 18; if the result of the hash operation is inconsistent with the signature of the router T of the RIQB, indicating that the signature is incorrect; then, switch to step 17.

In step 17, the routing request validation message RIQB is discarded; then, switch to step 21.

In step 18, any endorsing node of the routing validation blockchain system connected with the RT2-1 receives the RIQB, and validates the RIQB.

In 18.1, the signature of the RIQB is checked whether to be correct; if the signature is correct, switch to 18.2; if the signature is incorrect, switch to step 17.

In 18.2, the routing information identifier IDR is extracted from the RIQB.

In 18.3, the IDR is retrieved from the routing evidence blockchain, if an matched entry identical to the IDR is found in the routing evidence blockchain, then the validation is passed, switch to 18.4; otherwise, the validation is failed, switch to 18.6.

In 18.4, a routing information validation success message RIYC is constructed, namely, a validation success tag and the signature of the endorsing node are added at a tail of the RIQB, and the RIYC is fed back to the routing behavior validation terminal RT2-1.

In 18.5, the RT2-1 forwards the RIYC to the router T; then, switch to step 19.

In 18.6, a routing information validation failure message RIYS is constructed, namely, a validation failure tag and the signature of the endorsing node are added at the tail of the RIQB, and the routing information validation failure message is fed back to the routing behavior validation terminal RT2-1.

In 18.7, the RT2-1 forwards the RIYS to the router T; then, switch to step 20.

In step 19, the router T receives the RIYC, considers that the routing information RI conforms to the routing policy, learns a new routing from the RI, and adds the new routing to a routing table. Methods of learning routing and adding the routing table are the same as the well-known methods of learning routing and adding the routing table. Switch to step 21.

In step 20, the router T receives the RIYS, considers that the routing information RI violates the routing policy, and discards the RI; then, switch to step 21.

In step 21, switch to step 4.

What is claimed is:

1. A blockchain-based verifiable inter-domain routing validation method, comprising the following steps of:
   step 1: constructing a blockchain-based verifiable inter-domain routing system, wherein the blockchain-based verifiable inter-domain routing system consists of a verifiable inter-domain routing subsystem and a routing behavior validation subsystem which are connected via network;
   wherein the verifiable inter-domain routing subsystem consists of a plurality of autonomous domains, each autonomous domain has a plurality of routers, a routing behavior validation agent module is added in a routing software system of an inter-domain router, and the routing behavior validation agent module is communicated with other modules of the routing software system through inter-process calls; the routing behavior validation agent module is connected with a routing behavior validation terminal of the routing behavior validation subsystem via a network, the routing behavior validation agent module constructs routing basic information and a routing evidence according to routing information sent by the routing software system, generates routing validation request information, and sends the routing evidence and the routing validation request information to the routing behavior validation terminal; the routing evidence consists of five parts comprising the routing basic information, a forward routing evidence PRP, a routing information identifier IDR, a signature and a public key of a routing receiver as well as a signature and a public key of a routing sender, and the forward routing evidence PRP points to one routing evidence already stored in a routing evidence blockchain; the routing information identifier IDR is an unique identifier of the routing information, which replaces the routing information in a routing validation process; the signature of the routing receiver refers to a signature of the routing receiver when receiving the routing information, and the public key of the routing receiver refers to a public key used for asymmetric encryption; the signature of the routing sender refers to a signature of the routing sender when sending the routing evidence, and the public key of the routing sender refers to a public key used for asymmetric encryption; a routing evidence signature refers to a signature of the routing sender on the routing information, and the routing validation request information comprises routing basic information to be validated;
   the routing behavior validation subsystem consists of a routing behavior validation terminal and a routing validation blockchain system; the routing behavior validation terminal is deployed in an autonomous domain, and the routing behavior validation terminal is connected with the routing behavior validation agent module and the routing validation blockchain system, the routing behavior validation terminal receives the routing evidence and the routing validation request information from the routing behavior validation agent module, constructs a routing evidence validation proposal according to the routing evidence, and sends the routing evidence validation proposal, a routing evidence transaction and the routing validation request information to the routing validation blockchain system, wherein contents of the routing evidence transaction comprise the routing evidence and a signature of each endorsing node; and the routing behavior validation terminal consists of a routing evidence processing module and a routing validation request processing module;
   the routing validation blockchain system receives and processes the routing evidence validation proposal, and validates whether the routing evidence is correct; receives and processes the routing evidence transaction, packages the transaction into a block, and saves the block in the routing evidence blockchain; and validates the routing validation request information, and feeds back a validation result to the routing behavior validation agent module;
   the routing validation blockchain system is connected with the routing behavior validation terminal, and consists of an endorsing node, an ordering node, a submitting node, the routing evidence blockchain and a configuration file; and
   the endorsing node is provided with a routing evidence validation chain code, and receives the routing evidence validation proposal and the routing validation request information from the routing behavior validation terminal; the routing evidence validation chain code is a program for validating the routing evidence, which checks whether the routing basic information and the routing evidence signature of the routing evidence are correct, checks whether routing information corresponding to the routing evidence is the best routing, and endorses the routing evidence passing the validation; the ordering node receives the routing evidence transaction sent from the routing behavior validation terminal; the ordering node conducts an consensus operation on the routing evidence transaction, constructs a block after the consensus is completed, and sends the block to the submitting node; the submitting node receives the block from the ordering node and puts the block into the routing evidence blockchain; the routing evidence blockchain consists of blocks, and each block is divided into two parts: a block header and a block body, header information of the block is stored in the block header, which contains a block size, a hash value of a previous block, a hash value of the block body, a block ID and a timestamp, a transaction count and a transaction are stored in the block body, and the routing evidence is stored in the transaction; the configuration file is stored on each node, which stores configuration information of the routing validation blockchain system, the configuration file contains a number of the endorsing node, the ordering node and the submitting node, as well as network topology information of the nodes, and the network topology information comprises addresses of the nodes and a connection relation between the nodes;
   step 2: starting the routing behavior validation subsystem via a method comprising:
   2.1: starting the routing validation blockchain system:
   2.1.1: according to the configuration file in the routing validation blockchain system, starting the endorsing node, the submitting node and the ordering node with the specified number in the configuration file;

2.1.2: automatically configuring, by the endorsing node, the submitting node and the ordering node, addresses according to address information in the network topology information in the configuration file, and establishing a communication connection according to the network topology information in the configuration file;

2.1.3: setting, by all the endorsing nodes in the routing evidence blockchain, an endorsement policy;

2.1.4: initializing the routing evidence blockchain to be NULL;

2.1.5: constructing, by the ordering node, a consensus network according to the network topology information specified in the configuration file, and waiting, by all the ordering nodes in the consensus network, a routing evidence transaction sent from the endorsing node;

2.1.6: waiting, by the submitting node, to receive a block sent from the ordering node;

2.2 starting all the routing behavior validation terminals in all the autonomous domains of the verifiable inter-domain routing subsystem, wherein a process of starting any routing behavior validation terminal Tp comprises:

2.2.1: initializing the routing behavior validation terminal, comprising setting an autonomous domain serial number, setting an address of an endorsing node in the routing validation blockchain system to be connected with the Tp, and setting an address of an ordering node in the routing validation blockchain system to be connected with the Tp;

2.2.2: according to the address of the endorsing node connected with the Tp set in 2.2.1, conducting, by the Tp, identity authentication, to the endorsing node; if the identity authentication is passed, sending a connection application to the endorsing node; then, switching to 2.2.3; if the identity authentication is not passed, the Tp fails to be started, switching to 2.2.5;

2.2.3: sending, by the endorsing node, a message of "agreeing to establish the connection" to the Tp;

2.2.4: receiving, by the Tp, the message of "agreeing to establish the connection" from the endorsing node to complete the starting work, then, switching to step 3;

2.2.5: the Tp fails to be started, switching to 2.2.1;

step 3: setting all the successfully started routing behavior validation terminals in any autonomous domain AS1 of the verifiable inter-domain routing subsystem as n1, eavesdropping on, by the n1 successfully started routing behavior validation terminals, the information from the verifiable inter-domain routing subsystem, and confirming whether to establish a connection with the routing behavior validation agent module thereof, wherein n1 is less than or equal to n, n is a number of the routing behavior validation terminals in the AS1, and n is a positive integer, 3.1: setting the verifiable inter-domain routing subsystem to have M inter-domain routers, and starting, by the M inter-domain routers, the routing software system, wherein M is a positive integer, 3.2: starting, by all the inter-domain routers in the verifiable inter-domain routing subsystem, the routing behavior validation agent module, and sending, by the M inter-domain routers, autonomous domain information and router information to the routing behavior validation terminal in parallel, wherein a method for any inter-domain router R1 in any autonomous domain AS1 to send the autonomous domain information and the router information to the routing behavior validation terminal comprises:

3.2.1: initializing the routing behavior validation agent module of the R1, comprising setting the router where the routing behavior validation agent module is located, which is R1, and the information of the autonomous domain AS1 to which the R1 belongs, which is an autonomous domain serial number of the AS1, and setting an ID of the router R1, and setting IP addresses of n routing behavior validation terminals in the AS1;

3.2.2: sending, by the routing behavior validation agent module, the information of the autonomous domain AS1 and the information of the router R1 to n1 successfully started routing behavior validation terminals in the AS1, applying to establish a connection with any successfully started routing behavior validation terminal RT1-1 in the AS1, and sending the information of the autonomous domain AS1 and the information of the router R1 to the RT1-1;

3.3: eavesdropping on, by a routing validation request processing module of the RT1-1, a message from the AS1;

3.4: determining, by the routing validation request processing module of the RT1-1, whether the router R1 belongs to the AS1 via the autonomous domain information received from the AS1; if the router R1 belongs to the AS1, recording the information of the router R1, and agreeing to establish a connection with the routing behavior validation agent module of the R1; then, switching to step 4; if the router R1 does not belong to the AS1, rejecting to establish a connection with the routing behavior validation agent module of the R1; then, switching to 3.3;

step 4: sending, by any router R1 in the autonomous domain AS1, routing information RI, to one router T in an autonomous domain AS2;

step 5: receiving, by the router T, the routing information RI from the R1, and sending a routing information confirmation message according to situations via a method comprising:

5.1: checking, by the router T, a correctness of the RI; if the RI is correct, switching to 5.2; if the RI is wrong, discarding the RI; then, switching to step 6;

5.2: constructing, by the router T, a routing information confirmation message RIQ, and sending the RIQ to the router R1; then, switching to step 6;

step 6: waiting, by the R1, to receive the RIQ from the router T; if the R1 receives the RIQ sent from the router T, switching to step 7; if the routing information confirmation message RIQ is not received in a set time threshold S, switching to step 4;

step 7: mutually cooperating, by the R1, the routing behavior validation terminal RT1-1 of the AS1 and the routing validation blockchain system to construct a routing evidence and a routing evidence validation proposal according to a flow from step 8 to step 14, validating the routing evidence validation proposal, endorsing the routing evidence validation proposal, determining whether the routing evidence validation proposal with a signature of the endorsing node satisfies the endorsement policy, generating a routing evidence transaction, conducting consensus ordering on the routing evidence transaction, generating a block, and updating the routing validation blockchain; and meanwhile, mutually cooperating, by the router T, a routing behavior validation terminal RT2-1 of the AS2 and the routing validation blockchain system to construct a routing request validation message according to a flow from step 15 to step 20, checking whether the routing request validation message is correct, retrieving whether a routing evidence corresponding to the routing request exists in the routing validation blockchain, and feeding back a validation result of the routing information to the router T;

step 8: constructing, by the routing behavior validation agent module of the R1, a routing evidence according to the RI, and sending the routing evidence to the routing behavior validation subsystem via a method comprising:

8.1: extracting, by the routing behavior validation agent module of the R1, related contents from the routing information RI, and constructing a routing evidence RE via a method of forming the RE by the routing basic information, the forward routing evidence PRP, the routing information identifier IDR, the signature and the public key of the routing receiver as well as the signature and the public key of the routing sender;

8.2: sending, by a routing behavior validation agent module of the router R1, the routing evidence RE to the routing behavior validation terminal RT1-1;

step 9: receiving, by the routing behavior validation terminal RT1-1, the RE from the routing behavior validation agent module of the router R1, constructing the RE into a routing evidence validation proposal REA, and sending the REA to an endorsing node BS1 having a connection relation with the RT1-1;

step 10: monitoring, by the endorsing node BS1, whether the REA is received from the RT1-1; if the REA is received, checking a completeness of the REA; if the REA is complete, sending the REA to another K endorsing nodes that are specified in the endorsement policy and connected with the BS1 according to the endorsement policy, wherein K is a positive integer, then, switching to step 11; if the REA is incomplete, switching to step 10 to wait continuously;

step 11: validating, by the K endorsing nodes receiving the REA, the REA in parallel: extracting the routing evidence from the REA, calling the routing evidence validation chain code to validate the routing evidence, and obtaining K routing evidence validation proposal results, wherein the K endorsing nodes uses the same method to validate the REA, and a method for any endorsing node BSi in the K endorsing nodes to validate the REA comprises:

11.1: extracting, by the BSi, the routing evidence RE from the REA;

11.2: executing, by the BSi, the routing evidence validation chain code to validate the RE via a method as follows:

11.2.1: checking routing basic information of the RE via a method comprising:

11.2.1.1: checking whether the forward routing evidence PRP contained in the RE exists in the routing validation blockchain; if not, discarding the RE; then, switching to 11.5; if yes, determining whether a routing sending timestamp in the PRP contained in the routing validation blockchain is earlier than a routing sending timestamp in the RE; if yes, switching to 11.2.1.2; if not, discarding the RE; then, switching to 11.5;

11.2.1.2: checking whether a routing prefix address in the RE is the same as a routing prefix address in the PRP included in the routing validation blockchain; if yes, switching to 11.2.1.3; if not, discarding the RE; then, switching to 11.5;

11.2.1.3: checking whether routing classification information in the RE is consistent with routing classification information in the PRP included in the routing validation blockchain; if yes, switching to 11.2.2; if not, discarding the RE; then, switching to 11.5;

11.2.2: checking a signature of the RE via a method comprising:

11.2.2.1: using a public key of a routing sender of the RE to check whether a signature of the routing sender is correct; if yes, switching to 11.2.2.2; if not, discarding the RE; then, switching to 11.5;

11.2.2.2: 11.2.3; a public key of a routing receiver of the RE to check whether a signature of the routing receiver is correct; if yes, switching to 11.2.3; if not, discarding the RE; then, switching to 11.5;

11.2.3: checking whether routing information corresponding to the RE is the best routing, wherein a method is to use the ID of the R1 and the routing prefix address as indexes to retrieve in the routing validation blockchain and check whether a routing evidence satisfying index conditions exists: of the routing information corresponding to the RE is not the best routing, discarding the RE; then, switching to 11.5; if the RE passes the best routing validation, switching to 11.3;

11.3: endorsing, by the BSi, the routing evidence validation proposal REA, and generating a routing evidence validation proposal result, wherein an endorsing method of various blockchain platforms at current is adopted as an endorsing method, and contents of the routing evidence validation proposal result are the routing evidence validation proposal REA and a signature of the endorsing node BSi;

11.4: sending, by the BSi, the routing evidence validation proposal result with the signature of the BSi to the routing behavior validation terminal RT1-1; then, switching to step 12;

11.5: generating, by the BSi, a routing evidence validation proposal result with a signature field of the endorsing node being NULL, and sending the routing evidence validation proposal result to the routing behavior validation terminal RT1-1; then, switching to step 12;

step 12: successively receiving, by the routing behavior validation terminal RT1-1, the routing evidence validation proposal results from the K endorsing nodes, and determining whether the validated routing evidence validation proposals in the routing evidence validation proposal results successively received from the K endorsing nodes satisfy the endorsement policy via a method comprising:

12.1: checking whether a number of the routing evidence validation proposal results with the signature field of the endorsing node in the successively received K routing evidence validation proposal results is greater than or equal to Ki; if yes, switching to 12.2; if not, indicating that less than K1 endorsing nodes endorse and sign the routing evidence validation proposals, and the endorsement policy is not satisfied, which means that the round of inter-domain routing evidences cannot be stored in the blockchain; then, switching to step 21; wherein the K1 is stipulated in the endorsement policy, that is, the routing evidences signed by at least K1 endorsement nodes can be only submitted to the ordering node, and $1 \leq K1 \leq K$;

12.2: packaging, by the routing behavior validation terminal RT1-1, the K1 routing evidence validation proposal results into a routing evidence transaction, wherein the routing evidence and the signature of each endorsing node are stored in a transaction content in a structure of the routing evidence transaction, and sending the routing evidence transaction to any ordering node PX1 communicated with the RT1-1; then, switching to step 13;

step 13: determining, by the ordering node PX1, whether the routing evidence transaction is received from the RT1-1; if the routing evidence transaction is received, switching to 13.1; if the routing evidence transaction is not received, switching to step 13 to wait;

13.1: checking whether the transaction content conforms to the endorsement policy; if not, switching to 13.5; if yes, switching to 13.2;

13.2: sending, by the ordering node PX1, the routing evidence transaction to all other ordering nodes in the routing validation blockchain system;

13.3: conducting, by all the ordering nodes in the routing validation blockchain system, consensus ordering on the received routing evidence transaction; if a consensus is reached, switching to 13.4; if no consensus is reached, switching to 13.5;

13.4: generating, by all the ordering nodes in the routing validation blockchain system, the routing evidence transaction into a new block using a block generation method, wherein the N ordering nodes generates the same block, and broadcasting the block to all the submitting nodes in the routing validation blockchain system; then, switching to step 14;

13.5: discarding, by all the ordering nodes in the routing validation blockchain system, the routing evidence transaction; then, switching to step 21;

step 14: receiving, by all the submitting nodes in the routing validation blockchain system, the new block from the ordering nodes connected therewith, adding the block to a routing evidence validation blockchain, and checking whether the transaction in the block is valid, that is, validating whether the signature of the transaction is valid and whether the transaction satisfies the endorsement policy; if the transaction in the block is valid by checking, indicating that the transaction is signed and endorsed by the endorsing node, adding, by all the submitting nodes in the routing validation blockchain system, the block into a local routing validation blockchain; then, switching to step 21; if the transaction is invalid by checking, discarding the block, then, switching to step 21;

step 15: validating, by the router T, the routing information RI via a method as follows:

15.1: constructing, by a routing behavior validation agent module of the router T, a routing validation request, and sending the routing validation request to a routing behavior validation terminal of the autonomous domain AS2 to which the T belongs via a method as follows:

15.1.1: extracting, by the routing behavior validation agent module, the routing basic information from the RI;

15.1.2: constructing, by the routing behavior validation agent module, a routing request validation message RIQB of the RI, wherein contents of the RIQB comprise routing basic information of the RI, a public key of the router T, and a signature of the router T on the routing basic information of the RI;

15.1.3: sending, by the routing behavior validation agent module, the RIQB to the routing behavior validation terminal RT2-1 of the AS2;

step 16: receiving, by the routing behavior validation terminal RT2-1 of the AS2, the RIQB from the router T, and checking whether a signature of the RIQB is correct; if the signature is correct, sending the RIQB to the endorsing node of the routing validation blockchain system connected with the RT2-1; then, switching to step 18; if the signature is incorrect, switching to step 17;

step 17: discarding the routing request validation message RIQB; then, switching to step 21;

step 18: receiving, by any endorsing node of the routing validation blockchain system connected with the RT2-1, the RIQB, and validating the RIQB:

18.1: checking whether the signature of the RIQB is correct; if the signature is correct, switching to 18.2; if the signature is incorrect, switching to step 17;

18.2: extracting the routing information identifier IDR from the RIQB;

18.3: retrieving the IDR from the routing evidence blockchain, if an matched entry identical to the IDR is found in the routing evidence blockchain, then the validation is passed, switching to 18.4; otherwise, the validation is failed, switching to 18.6;

18.4: constructing a routing information validation success message RIYC, namely, adding a validation success tag and the signature of the endorsing node at a tail of the RIQB, and feeding back the RIYC to the routing behavior validation terminal RT2-1;

18.5: forwarding, by the RT2-1, the RIYC to the router T; then, switching to step 19;

18.6: constructing a routing information validation failure message RIYS, namely, adding a validation failure tag and the signature of the endorsing node at the tail of the RIQB, and feeding back the routing information validation failure message to the routing behavior validation terminal RT2-1;

18.7: forwarding, by the RT2-1, the RIYS to the router T; then, switching to step 20;

step 19: receiving, by the router T, the RIYC, considering that the routing information RI conforms to the routing policy, learning a new routing from the RI, and adding the new routing to a routing table; then, switching to step 21;

step 20: receiving, by the router T, the RIYS, considering that the routing information RI violates the routing policy, and discarding the RI; then, switching to step 21; and step 21: switching to step 4.

2. The blockchain-based verifiable inter-domain routing validation method according to claim 1, wherein the routing information refers to a routing message transmitted between routers, and consists of a source AS number, a destination AS number, a timestamp, a routing prefix and a routing operation; and the routing basic information comprises an ID of the routing sender, an ID of the routing receiver, the routing sending timestamp, the routing prefix address, the routing operation and the routing classification information.

3. The blockchain-based verifiable inter-domain routing validation method according to claim 1, wherein the routing validation blockchain system is implemented on the basis of a Fabric blockchain platform; a structure of the REA is the same as a proposal structure of the Fabric blockchain platform, and a proposal construction method of the Fabric blockchain platform is employed as a REA construction method; a method for the Fabric blockchain platform to extract data from a proposal is employed as the method for extracting the routing evidence; the routing evidence transaction has the same structure as that of a routing evidence transaction of the Fabric blockchain platform; a consensus algorithm PBFT published by the Fabric blockchain platform is employed in the consensus ordering.

4. The blockchain-based verifiable inter-domain routing validation method according to claim 1, wherein a password-based authentication method is employed by the Tp to conduct the identity authentication to the endorsing node in the step 2.2.2.

5. The blockchain-based verifiable inter-domain routing validation method according to claim 1, wherein a method for a BGP routing protocol to check routing information is employed by the router T to check the RI in step 5.1.

6. The blockchain-based verifiable inter-domain routing validation method according to claim 1, wherein a method for the router T to construct the routing information confirmation message RIQ and send the RIO to the router R1 in step 5.2 comprises:
- 5.2.1: extracting the routing basic information from the RI;
- 5.2.2: constructing, by the router T, the routing information confirmation message RIQ according to the RI via a method comprising: adding a public key and a signature of the router T behind the RI; and a method for acquiring the signature of the router T comprises: using a private key of the router T to sign the routing basic information of the RI to obtain a signature of the router T on the routing basic information of the RI; and
- 5.2.3: sending, by the router T, the RIQ to the router R1.

7. The blockchain-based verifiable inter-domain routing validation method according to claim 1, wherein the time threshold S in step 6 is set as 10 seconds.

8. The blockchain-based verifiable inter-domain routing validation method according to claim 1, wherein a method for constructing the routing evidence RE in step 8.1 comprises:
- 8.1.1: constructing the basic routing information, wherein the ID of the routing sender is obtained by hashing the source AS number of the routing information; the ID of the routing receiver is obtained by hashing the destination AS number of the routing information; the routing sending timestamp is obtained from a timestamp of the routing information, and the routing prefix address is obtained from a routing prefix field of the routing information; routing operation settings are obtained from a routing operation field of the routing information; and the routing classification information is generated according to a path length of the routing information and expressed in 16-bit binary; assuming that the path length is nn, an nn-th binary of the routing classification information is set as 1, and the other bits are set as 0, and nn is a positive integer,
- 8.1.2: constructing the forward routing evidence PRP and pointing to a routing evidence already stored in the routing evidence blockchain, assuming that the routing evidence pointed by the PRP corresponds to routing information RI', which is the routing information received by the router R1 from other routers, then adding self-information of the R1 behind the RI' by the R1 to obtain the routing information RI;
- 8.1.3: constructing the routing information identifier IDR, namely, combining the ID of the routing sender, the ID of the routing receiver, the routing sending timestamp, the routing prefix address, the routing operation, and a hash value of the routing classification information into the IDR;
- 8.1.4: using the signature of the routing receiver when receiving the routing information as the signature of the routing receiver, and using a self-provided public key of the routing receiver as the public key of the routing receiver, and
- 8.1.5: using the signature of the routing sender when sending the routing evidence as the signature of the routing sender, and using a self-provided public key of the routing sender as the public key of the routing sender.

9. The blockchain-based verifiable inter-domain routing validation method according to claim 1, wherein a method of using the public key of the routing sender of the RE to check whether the signature of the routing sender is correct in step 11.2.2.1 comprises: using the public key of the routing sender to conduct a hash operation on contents of the RE, and comparing whether a result of the hash operation is consistent with the signature of the routing sender of the RE.

10. The blockchain-based verifiable inter-domain routing validation method according to claim 1, wherein a method of checking whether the routing information corresponding to the RE is the best routing in step 11.2.2.1 specifically comprises:
- 11.2.3.1: if a routing evidence RE' is found in the routing validation blockchain, satisfying that routing classification information of the RE' is better than that of the RE, namely, a path length of the routing information corresponding to the RE' is smaller than that of the routing information corresponding to the RE, a router once is proved to send a better routing to the R1, but the R1 does not send the routing information to the routing receiver T, namely, the routing information corresponding to the RE is not the best routing; and
- 11.2.3.2: if the routing evidence satisfying the index conditions is not found in the routing validation blockchain, indicating that the routing information sent by the routing sender R1 to the routing receiver T is the best routing, and the RE passes the best routing validation.

11. The blockchain-based verifiable inter-domain routing validation method according to claim 1, wherein a method for the routing behavior validation terminal RT2-1 to check whether the signature of the RIQB is correct in step 16 comprises: using the public key of the router T to conduct a hash operation on contents of the RIQB, and comparing whether a result of the hash operation is consistent with the signature of the router T of the RIQB; if the result of the hash operation is consistent with the signature of the router T of the RIQB, indicating that the signature of the RIQB is correct; if the result of the hash operation is inconsistent with the signature of the router T of the RIQB, indicating that the signature of the RIQB is incorrect.

* * * * *